US011592708B2

United States Patent
Kim et al.

(10) Patent No.: US 11,592,708 B2
(45) Date of Patent: Feb. 28, 2023

(54) COMPENSATION DEVICE FOR LUMINANCE UNIFORMITY AND METHOD THEREOF

(71) Applicant: SAMSUNG ELECTRONICS CO., LTD., Suwon-si (KR)

(72) Inventors: Ju Yong Kim, Suwon-si (KR); Jin Sung An, Suwon-si (KR); Sung Ju Lee, Suwon-si (KR); Seung Sin Lee, Suwon-si (KR); Hye Young Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

(21) Appl. No.: 16/761,327

(22) PCT Filed: Oct. 31, 2018

(86) PCT No.: PCT/KR2018/013139
§ 371 (c)(1),
(2) Date: May 4, 2020

(87) PCT Pub. No.: WO2019/088717
PCT Pub. Date: May 9, 2019

(65) Prior Publication Data
US 2021/0181583 A1 Jun. 17, 2021

(30) Foreign Application Priority Data
Nov. 2, 2017 (KR) .......................... 10-2017-0145525

(51) Int. Cl.
*H05B 45/10* (2020.01)
*G02F 1/13357* (2006.01)
(Continued)

(52) U.S. Cl.
CPC .. *G02F 1/133611* (2013.01); *G02F 1/133603* (2013.01); *G02F 1/136254* (2021.01); *H04N 5/57* (2013.01); *H05B 45/10* (2020.01)

(58) Field of Classification Search
CPC ......... G02F 1/133611; G02F 1/136254; G02F 1/133603; H05B 45/10; H04N 5/57; H04N 17/02
See application file for complete search history.

(56) References Cited

U.S. PATENT DOCUMENTS

| 2016/0019838 | A1* | 1/2016 | Park | G09G 3/3275 |
| | | | | 345/690 |
| 2016/0033795 | A1* | 2/2016 | Zhang | G09G 3/36 |
| | | | | 345/89 |
| 2017/0263198 | A1* | 9/2017 | Zhu | G09G 3/3607 |

FOREIGN PATENT DOCUMENTS

| JP | 2017-120330 A | 7/2017 |
| KR | 10-0731350 B1 | 6/2007 |

(Continued)

OTHER PUBLICATIONS

Communication dated Jun. 22, 2021, issued by the Korean Intellectual Property Office in Korean Patent v Application No. 10-2017-0145525.

(Continued)

*Primary Examiner* — Minh D A
(74) *Attorney, Agent, or Firm* — Sughrue Mion, PLLC

(57) ABSTRACT

Embodiments of the disclosure relate to a compensation device of luminance uniformity and a controlling method thereof, more particularly, to a technology of predicting a level of maximum luminance value that is changed in compensating luminance uniformity of an image displayed on a display apparatus and providing it to a user.

A compensation device of luminance uniformity according to an embodiment includes a data acquirer configured to (Continued)

acquire a luminance value of an image displayed on a display apparatus; a controller configured to determine a maximum luminance value and a minimum luminance value among the acquired luminance values, and determine luminance uniformity of the minimum luminance value based on the maximum luminance value, and determine a change amount of the maximum luminance value to be adjusted in order to change the determined luminance uniformity; and a display configured to display the change amount of the maximum luminance value adjusted to change the luminance uniformity, and the luminance uniformity that is changed in response to the change amount of the maximum luminance value.

13 Claims, 11 Drawing Sheets

(51) Int. Cl.
*G02F 1/1362* (2006.01)
*H04N 5/57* (2006.01)

(56) References Cited

FOREIGN PATENT DOCUMENTS

| KR | 10-2014-0036907 A | 3/2014 |
| KR | 10-2014-0095793 A | 8/2014 |
| KR | 10-1648762 B1 | 8/2016 |
| KR | 10-2017-0120330 A | 10/2017 |

OTHER PUBLICATIONS

Communication dated Dec. 16, 2021 by the Korean Intellectual Property Office in Korean Patent English Application No. 10-2017-0145525.
International Search Report (PCT/ISA/210) dated Feb. 28, 2019 issued by the International Searching Authority in International Application No. PCT/KR2018/013139.

* cited by examiner

COMPENSATION DEVICE FOR LUMINANCE UNIFORMITY AND METHOD THEREOF

TECHNICAL FIELD

Embodiments of the disclosure relate to a compensation device for luminance uniformity and a method thereof, and more specifically, to a technology of predicting a level of maximum luminance value that is changed in compensating luminance uniformity of an image displayed on a display apparatus and providing it to a user.

BACKGROUND ART

With the development of electronic technology, various types of electronic devices have been developed and distributed. For example, display devices such as TVs, monitors, and large billboards are widely used in general homes, companies, and public places.

Display apparatuses have been continuously developed in a direction of high brightness, high integration, and large size, and include a display panel such as LCD or PDP. Of the display panels, LCD (liquid crystal display) panels cannot emit light on their own, LED (light emitting diode) was used as a light source for LCD in the existing fluorescent light source, and was supplemented by the introduction of a back light unit (BLU) system that placed a board with a white LED package on the outside of an LCD frame. Since then, mass production of OLED (organic light emitting diode) panels has been successful, and a new type of display has been provided.

The display panels may have uneven luminance and color distribution due to various reasons. For example, the periphery may be relatively dark compared to the center, or the color of an entire screen may not be uniform. This phenomenon is called non-uniformity.

The non-uniformity of the display panel may occur due to differences between light source driver chips, welding problems of light source modules, flatness problems of module assembly, and differences in the central axis position of the light sources.

The manufacturing process of the display device includes a process of manufacturing the display device and a process of inspecting luminance uniformity of the completed display panel. In recent years, the importance of a technique for accurately predicting a level of luminance that is changed in correcting the luminance uniformity of the display panel has been emphasized.

DISCLOSURE

Technical Problem

In compensating luminance uniformity of an image displayed on a display apparatus, an object of the disclosure is to accurately predict a level of changed luminance so that a user can select a desired luminance uniformity and luminance value.

Technical Solution

In accordance with an aspect of the disclosure, a compensation device for luminance uniformity includes: a data acquirer configured to acquire a luminance value of an image displayed on a display apparatus; a controller configured to determine a maximum luminance value and a minimum luminance value among the acquired luminance values, and determine luminance uniformity of the minimum luminance value based on the maximum luminance value, and determine a change amount of the maximum luminance value to be adjusted in order to change the determined luminance uniformity; and a display configured to display the change amount of the maximum luminance value adjusted to change the luminance uniformity, and the luminance uniformity that is changed in response to the change amount of the maximum luminance value.

Also, the controller may calculate a difference between the determined maximum luminance value and the determined minimum luminance value.

Also, the controller may determine the luminance uniformity of the minimum luminance value by calculating a ratio of the minimum luminance value to the maximum luminance value as a percentage value.

Also, the controller may calculate a difference between the luminance uniformity of the determined maximum luminance value and the luminance uniformity of the determined minimum luminance value.

Also, the controller may determine the change amount of the maximum luminance value to be adjusted in order to change the luminance uniformity of the minimum luminance value by dividing the difference between the calculated maximum luminance value and the minimum luminance value by the difference between the luminance uniformity of the calculated maximum luminance value and the luminance uniformity of the minimum luminance value.

Also, the device may further include an input configured to receive the change amount of the maximum luminance value that is adjusted to change the luminance uniformity of the minimum luminance value.

Also, the input may receive a new set value for the luminance uniformity of the minimum luminance value.

Also, the controller may generate a control signal for changing the luminance uniformity of the minimum luminance value of the display apparatus based on at least one of the change amount of the maximum luminance value and the new set value for the luminance uniformity.

Also, the device may further include a communicator configured to transmit the generated luminance uniformity change control signal to the display apparatus.

Also, the data acquirer divides a screen of the display apparatus into a plurality of sub-blocks, and acquires a luminance value of each of the sub-blocks.

In accordance with an embodiment, a controlling method of a compensation device of luminance uniformity may include: acquiring a luminance value of an image displayed on a display apparatus; determining a maximum luminance value and a minimum luminance value among the acquired luminance values; determining luminance uniformity of the minimum luminance value based on the maximum luminance value, determining a change amount of the maximum luminance value to be adjusted in order to change the determined luminance uniformity; and displaying the change amount of the maximum luminance value adjusted to change the luminance uniformity, and the luminance uniformity that is changed in response to the change amount of the maximum luminance value.

Also, the determining the change amount of the maximum luminance value may include calculating a difference between the determined maximum luminance value and the determined minimum luminance value.

Also, the determining the luminance uniformity of the maximum luminance value may include determining the luminance uniformity of the minimum luminance value by calculating a ratio of the minimum luminance value to the maximum luminance value as a percentage value.

Also, the determining the change amount of the maximum luminance value may include calculating a difference between the luminance uniformity of the determined maximum luminance value and the luminance uniformity of the determined minimum luminance value.

Also, the determining the change amount of the maximum luminance value may include determining the change amount of the maximum luminance value to be adjusted in order to change the luminance uniformity of the minimum luminance value by dividing the difference between the calculated maximum luminance value and the minimum luminance value by the difference between the luminance uniformity of the calculated maximum luminance value and the luminance uniformity of the minimum luminance value.

Also, the method may further include receiving the change amount of the maximum luminance value that is adjusted to change the luminance uniformity of the minimum luminance value.

Also, the method may further include receiving a new set value for the luminance uniformity of the minimum luminance value.

Also, the method may further include generating a control signal for changing the luminance uniformity of the minimum luminance value of the display apparatus based on at least one of the change amount of the maximum luminance value and the new set value for the luminance uniformity.

The method may further include transmitting the generated luminance uniformity change control signal to the display apparatus.

The method may further include dividing a screen of the display apparatus into a plurality of sub-blocks, and acquiring a luminance value of each of the sub-blocks.

Advantageous Effects

In compensating the luminance uniformity of the image displayed on the display apparatus, there is an effect of predicting the level of the changed maximum luminance value and providing accurate information to the user. In addition, the user can set the image level of the display apparatus to a desired level of luminance by selecting the luminance value and the luminance uniformity of the display image.

BEST MODE

Mode for Invention

Figure 1:
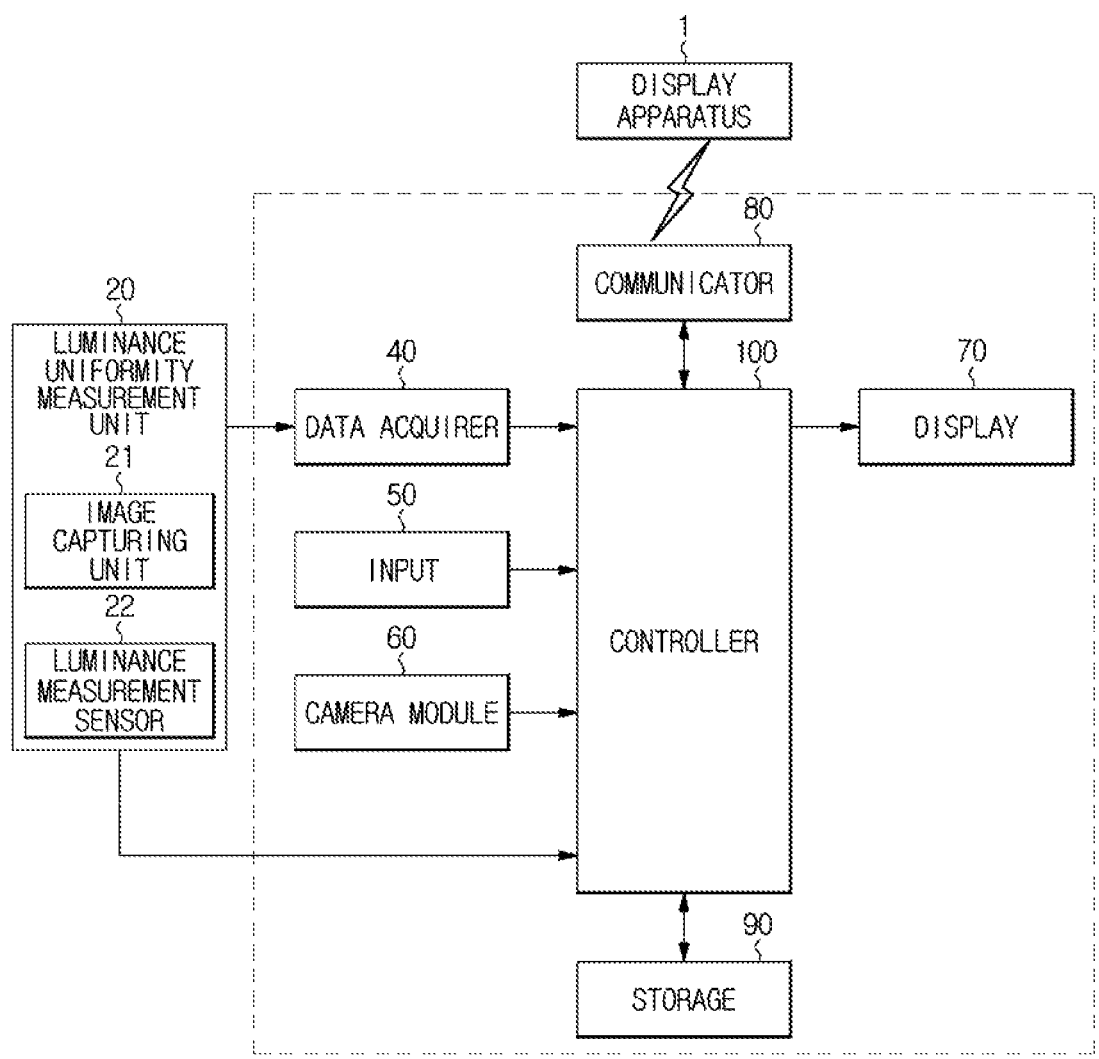
FIG. 1 is a control block diagram of a compensation device of luminance uniformity according to an embodiment.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

It will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in an order different unless otherwise stated.

Hereinafter, embodiments of the present disclosure will be described with reference to the accompanying drawings.

Figure 2:
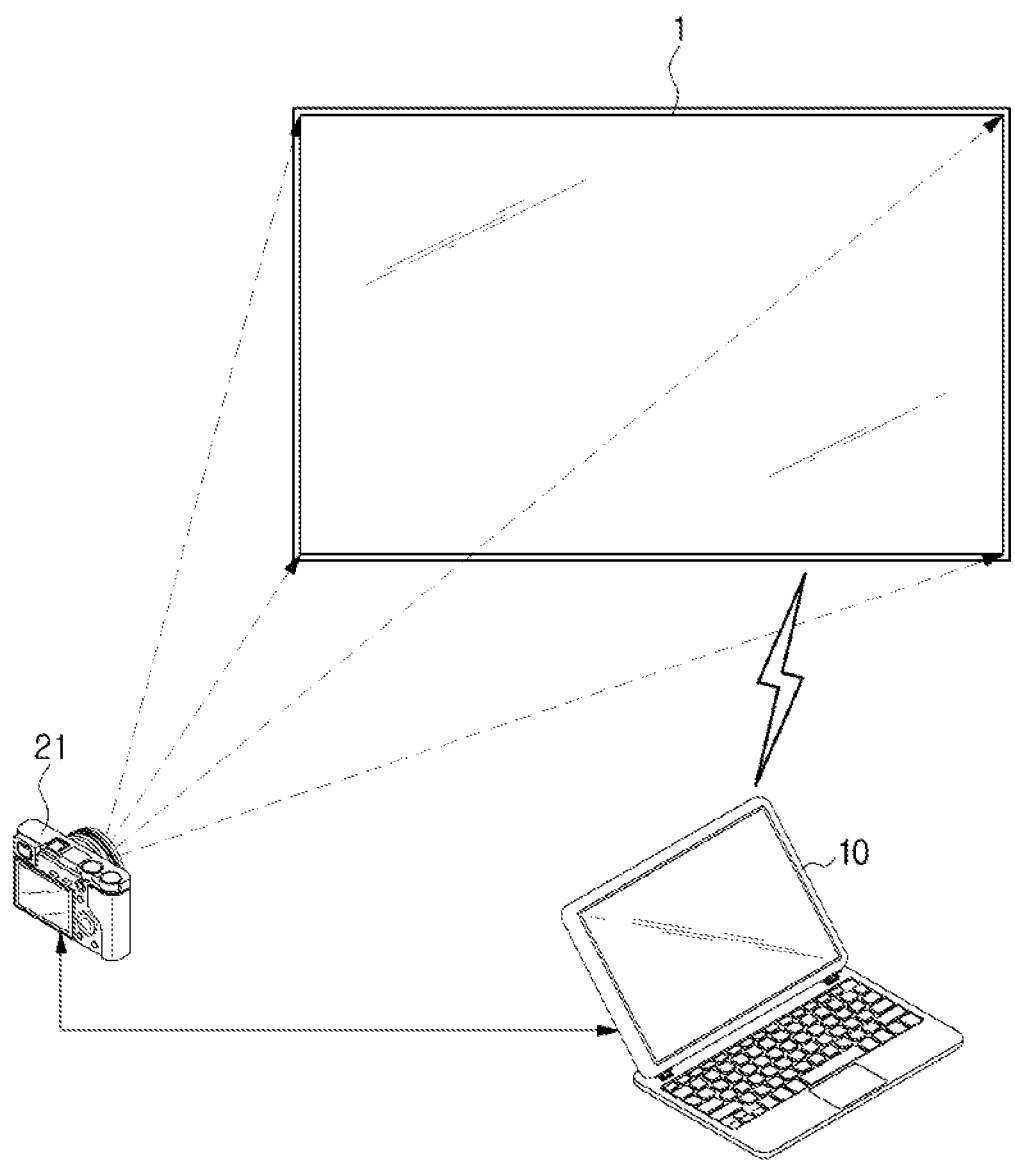
FIG. 2 illustrates an example of a configuration of a compensation device of luminance uniformity for obtaining a luminance value of a display apparatus from a luminance uniformity measuring unit according to an embodiment.
Figure 3:
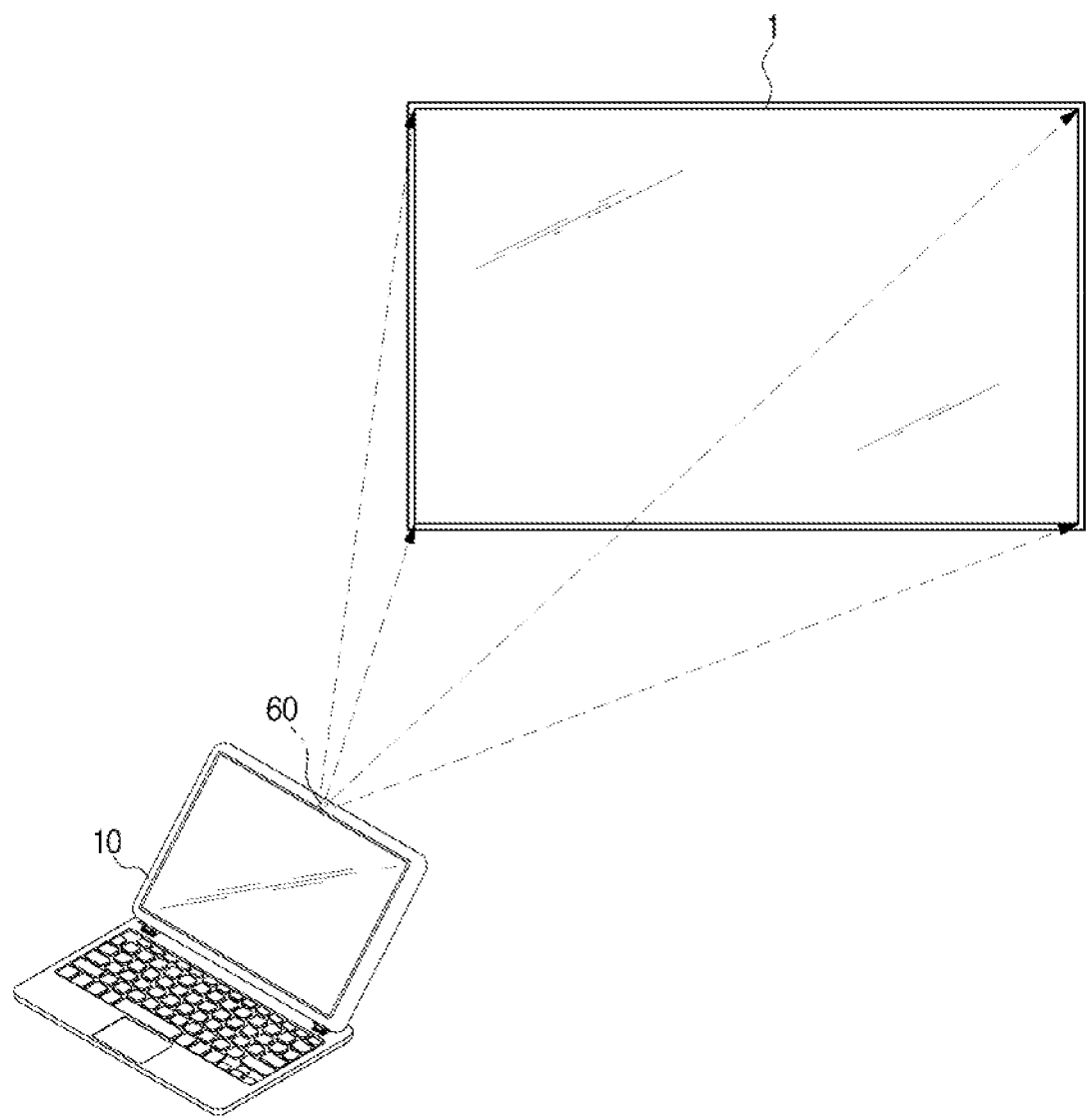
FIG. 3 illustrates that a compensation device of luminance uniformity according to an embodiment measures a luminance value of a display apparatus.

FIG. 1 is a control block diagram of a compensation device of luminance uniformity according to an embodiment. FIG. 2 illustrates an example of a configuration of a compensation device of luminance uniformity for obtaining a luminance value of a display apparatus from a luminance uniformity measuring unit according to an embodiment. FIG. 3 illustrates that a compensation device of luminance uniformity according to an embodiment measures a luminance value of a display apparatus.

Referring to FIG. 1, a compensation device of luminance uniformity 10 according to an embodiment includes a data acquirer 40 for obtaining a luminance value of an image displayed on a display apparatus 1 from a luminance uniformity measurement unit 20, an input 50 that receives a command related to a control of the compensation device of luminance uniformity 10 from a user, a camera module 60 for measuring luminance and luminance uniformity by taking an image of the display apparatus 1, a display 70 for displaying data related to a setting of the luminance and luminance uniformity of the display apparatus 1, a communicator 80 for transmitting data related to the luminance and luminance uniformity set in the compensation device of luminance uniformity 10 to the display apparatus 1, a storage 90 for storing data related to the control of the compensation device of luminance uniformity 10, and a controller 100 that controls each component included in the compensation device of luminance uniformity 10.

The compensation device of luminance uniformity 10 according to an embodiment may be implemented as various user terminal devices such as a PC, a laptop computer, a mobile phone or a tablet PC, but is not limited thereto. That is, any device that can adjust the uniformity of the luminance of the display apparatus 1 may be implemented in any form.

The data acquirer 40 may acquire the luminance value of the image displayed on the display apparatus 1 from the luminance uniformity measurement unit 20. At this time, the luminance uniformity measurement unit 20 may be a separate external device from the compensation device of luminance uniformity 10, such as an image capturing unit 21 or a luminance measurement sensor 22.

The luminance uniformity measurement unit 20 can be wirelessly connected to the compensation device of luminance uniformity 10 via a wired network or wireless network, and FIG. 2 illustrates a case where the image capturing unit 21 is connected to the compensation device of luminance uniformity 10 implemented by a laptop PC.

As shown in FIG. 2, when the luminance uniformity measurement unit 20 is implemented as the image capturing unit 21 such as a camera, the image capturing unit 21 may capture the display apparatus 1 to obtain the luminance value of the display apparatus 1.

The image capturing unit 21 may be implemented as a vision camera, a CCD camera or an image sensor, but is not limited thereto, and various image capturing devices capable of capturing images may be used.

A test patch (not shown) for providing information such as a luminance value of an image may be displayed on the display apparatus 1, and the image capturing unit 21 may capture the test patch image displayed on the display apparatus 1 and provide the captured image as the compensation device of luminance uniformity 10.

The image capturing unit 21 may be manually controlled by the user to perform capturing, but may be automatically performed by controlling the compensation device of luminance uniformity 10. In this case, the image capturing unit 21 may be implemented in a fixed form with a jig or tripod.

Although not shown in the drawing, the luminance uniformity measurement unit 20 may be implemented as the luminance measurement sensor 22 that acquires information related to luminance of the display apparatus 1.

The user can obtain the luminance value of the image displayed on the display apparatus 1 by making the luminance measurement sensor 22 contact the display apparatus 1 directly. The luminance measurement sensor 22 may be implemented with a plurality of sensors, and as described later, when a screen of the display apparatus 1 is divided into a plurality of sub-blocks, luminance values at each position of the sub-block can be obtained.

In addition, the luminance measurement sensor 22 may not be implemented as an external device, but may be a component included in the display apparatus 1.

That is, the display apparatus 1 may include a plurality of the luminance measurement sensors 22 and may measure the luminance values at each location of the sub-block of the screen of the display apparatus 1. The luminance measurement sensor 22 may be built in the display apparatus 1, as a method of embedding the luminance measurement sensor 22. In the case of an LCD panel, there is a method of drilling a small hole in a support plate supporting a BLU (Back Light Unit) inside the panel and installing the luminance measurement sensor 22 in the hole. Alternatively, in the case of a PDP panel, there is a method of drilling a small hole in a chassis base portion supporting the panel to install the luminance measurement sensor 22 in the hole.

The luminance measurement sensor 22 may be a Cds (photoconductor cell), a photodiode, a phototransistor, a photothyristor, a CCD, a MOS image sensor, or the like. For more precise measurement, a photoelectric tube or a photomultiplier tube may be used.

The luminance measurement sensor 22 may obtain the luminance value of the display apparatus 1 and provide the luminance value to the compensation device of luminance uniformity 10.

As illustrated in FIG. 3, the compensation device of luminance uniformity 10 may directly acquire a luminance value by capturing an image displayed on the display apparatus 1 through the camera module 60.

That is, the compensation device of luminance uniformity 10 may further include the camera module 60, and the luminance value acquired by the camera module 60 through capturing may be transferred to the data acquirer 40.

The method by which the compensation device of luminance uniformity 10 directly acquires the luminance value of the display apparatus 1 through the camera module 60 is the same as the method obtained by the image capturing unit 21 described above, so a duplicate description is omitted.

The data acquirer 40 may acquire the luminance value of the display apparatus 1 obtained by the luminance uniformity measurement unit 20 or the camera module 60 and transmit it to the controller 100.

Figure 4:
FIG. 4 illustrates that a screen of a display apparatus is divided into a plurality of sub-blocks according to an embodiment.

FIG. 4 illustrates that a screen of a display apparatus is divided into a plurality of sub-blocks according to an embodiment.

Referring to FIG. 4, the data acquirer 40 divides the screen of the display apparatus 1 into the plurality of sub-blocks, and the luminance values of each of the sub-blocks based on luminance values obtained by the luminance uniformity measurement unit 20 or the camera module 60 can be obtained.

As illustrated in FIG. 4, the screen of the display apparatus 1 may be divided into 5×5 sub-blocks, or 3×3 sub-blocks. In this way, there is no limit to the standard or number of the screens of the display apparatus 1 divided into the sub-blocks.

Hereinafter, for convenience of description, it will be described as an example in which the screen of the display apparatus 1 is divided into the 5×5 sub-blocks and the compensation value of luminance uniformity is determined based on the luminance value obtained for each block.

The compensation device of luminance uniformity 10 can determine the luminance non-uniformity of the screen by dividing one of the screens of the display apparatus 1 into the plurality of sub-blocks and measuring the luminance of each of the blocks.

When the screen of the display apparatus 1 is divided into the 5×5 sub-blocks, it may be divided into 25 uniformly sized sub-blocks. The data acquirer 40 divides the screen into the 25 uniform sub-blocks, and by setting coordinates in each of the blocks, the position of the block and the luminance value of the corresponding block can be obtained.

As described above, the luminance uniformity measurement unit 20 or the camera module 60 measures the entire luminance value of the screen of the display apparatus 1 and transmits it to the data acquirer 40, and the luminance value of each of the sub-blocks may be measured based on a preset sub-block and transmitted to the data acquirer 40.

When the luminance value of the entire screen of the display apparatus 1 is obtained by the luminance uniformity measurement unit 20, the data acquirer 40 may divide the screen into the plurality of sub-blocks to acquire the luminance values of each of the blocks.

As described above, since the luminance values of each of the sub-blocks divided into the plurality are not uniform, the quality of luminance is not the same depending on the position of the blocks constituting the screen even in one of the screens. Therefore, it is necessary to set a uniform brightness throughout the screen by compensating the luminance uniformity so that uniform luminance can be realized for each position of the screen of the display apparatus 1.

Figure 5:
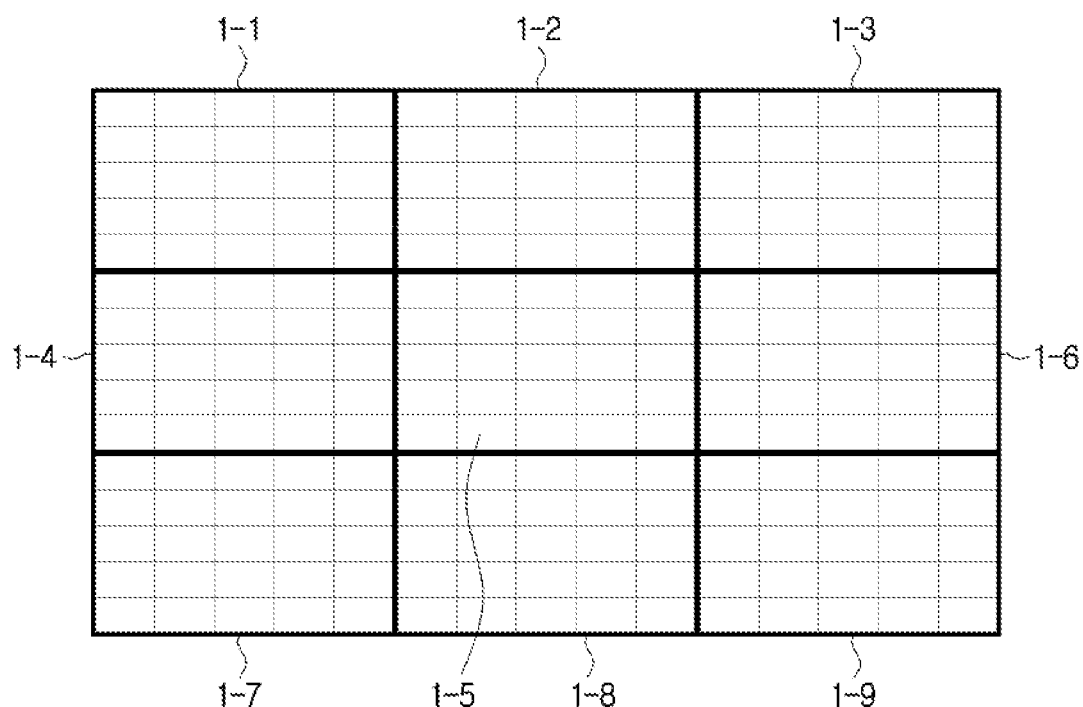
FIG. 5 illustrates a display system including a plurality of display apparatuses according to an embodiment.

FIG. 5 illustrates a display system including a plurality of display apparatuses according to an embodiment.

As shown in FIG. 5, a large display implemented in a video wall form by connecting a plurality of the display apparatuses 1 is called a large format display (LFD). In such a video wall type display system, various media displayed on the screen of each of the display apparatuses 1 move as one to realize a visual effect.

In a display system including the plurality of display apparatuses 1, luminance of each of the plurality of display apparatuses 1 may be different due to differences in panels of each of the display apparatuses 1 and design differences. Therefore, it is necessary to effectively correct the luminance uniformity so that the luminance of each of the plurality of display apparatuses 1 becomes uniform in the video wall system.

FIG. 5 illustrates a display system including nine display devices 1-1, 1-2, . . . , 1-9 arranged in a 3×3 shape.

As described above, when each of the screens of the display apparatus 1 included in the display system is further divided into the 5×5 sub-blocks, the screen of the display system may include a total of 225 sub-blocks.

The data acquirer 40 divides the screens of the nine display apparatuses 1 into the 225 uniform sub-blocks, and by setting coordinates in each of the blocks, the position of the block and the luminance value of the corresponding block can be acquired.

Figure 6:
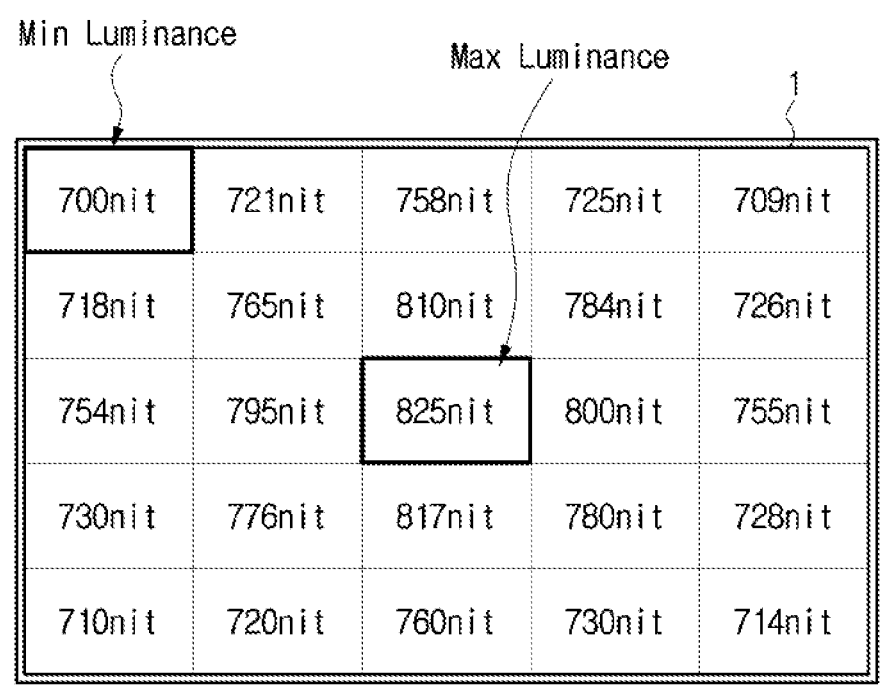
FIGS. 6 and 7 are diagrams for determining a maximum luminance value and a minimum luminance value of a display apparatus screen according to an embodiment.
Figure 7:
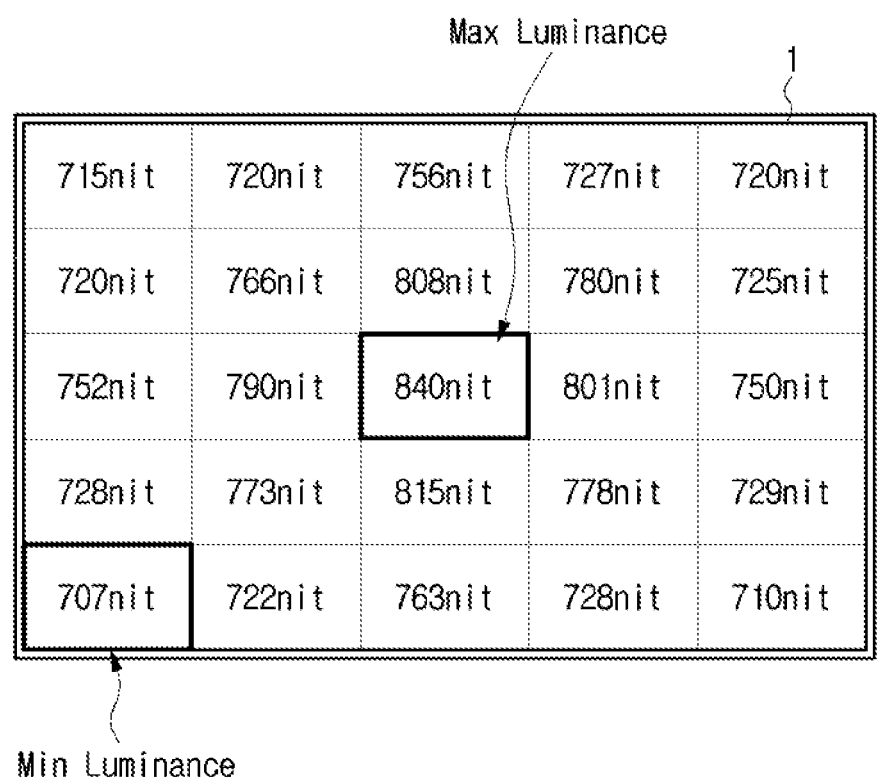

FIGS. 6 and 7 are diagrams for determining a maximum luminance value and a minimum luminance value of a display apparatus screen according to an embodiment.

The luminance of screen of the display apparatus 1 generally has the largest value at the center of the screen, and gradually becomes lower as it moves away from the center. That is, since the luminance value is different according to the position of the sub-block divided on the screen, luminance unevenness occurs across the entire screen of the display apparatus 1. Therefore, the controller 100 must uniformly adjust the luminance of the screen divided into the sub-blocks.

The controller 100 may determine the minimum luminance value (Minimum Luminance) and the maximum luminance value (Maximum Luminance) based on the luminance value acquired by the data acquirer 40.

Referring to FIG. 6, the luminance value obtained by the data acquirer 40 by dividing the screen of the display apparatus 1 into the 25 sub-blocks has 25 luminance values. The controller 100 may determine the maximum luminance value having the highest luminance and the minimum luminance value having the lowest luminance among the 25 luminance value data.

The unit of luminance may be expressed in candelas per area (Cd/m2) or nits. In one embodiment of the disclosed invention, a case where the unit of luminance is indicated in nits will be described as an example.

In the display apparatus 1 illustrated in FIG. 6, the controller 100 may determine 825 nits as the maximum luminance value and 700 nits as the maximum luminance value. Similarly, in the display apparatus 1 shown in FIG. 7, the controller 100 may determine 840 nits as the maximum luminance value and 707 nits as the maximum luminance value.

Conventionally, when the maximum luminance value and the minimum luminance value for the screen of the display apparatus 1 are determined, the luminance value of the sub-block having the maximum luminance value is lowered to the minimum luminance value to ensure uniformity of luminance.

That is, when there is a difference in luminance, since it is relatively easy to lower than raise the luminance, a sub-block having a low luminance value among all the sub-blocks is set as a reference sub-block, and the luminance uniformity was secured by matching the luminance of the sub-block with the highest luminance value to the luminance of the reference sub-block. However, in this case, if the luminance value matches the luminance of the sub-block having the lowest luminance value, excessive luminance reduction occurs for the sub-block having the high luminance value.

Therefore, there is a need to secure the uniformity of luminance for the screen of the display apparatus 1 and also to reduce the amount of luminance reduction for the high luminance.

The compensation device of luminance uniformity 10 according to an embodiment of the disclosed invention predicts data on how much the maximum luminance value should be adjusted to change the luminance uniformity, and the predicted data is provided to the user, so that the user can select the degree of securing the luminance uniformity and adjusting the luminance.

The controller 100 may calculate a difference between the maximum luminance value and the minimum luminance value. Based on the embodiment shown in FIG. 6, the controller 100 may obtain a luminance difference of 125 nits by calculating the difference between the maximum luminance value of 825 nits of the display apparatus 1 and the minimum luminance value of 700 nits.

The controller 100 may determine the luminance uniformity for the luminance value of the display apparatus 10. That is, the luminance uniformity is an index indicating how uniform the maximum luminance value and the minimum luminance value are on the screen of the display apparatus 1.

The controller 100 may determine the luminance uniformity of the minimum luminance value by calculating the ratio of the minimum luminance value to the maximum luminance value as a percentage value, as shown in Equation 1.

$$\text{Luminance uniformity of minimum} \qquad \text{[Equation 1]}$$
$$\text{luminance value} = \frac{\text{Minimum luminance value}}{\text{Maximum luminance value}} * 100$$

Based on the embodiment shown in FIG. 6, when the ratio of the minimum luminance value of 700 nits to the maximum luminance value of 825 nits is calculated as a percentage according to Equation 1, luminance uniformity of approximately 85% is calculated. This means the ratio of the minimum luminance value based on the maximum luminance value.

The controller 100 may calculate a difference between the luminance uniformity of the maximum luminance value and the luminance uniformity of the minimum luminance value. That is, since the luminance uniformity indicates a ratio of different luminance values based on the maximum luminance value, the luminance uniformity of the maximum luminance value becomes 100%, therefore, the difference between the luminance uniformity of the maximum luminance value and the luminance uniformity of the minimum luminance value corresponds to 100 minus the luminance uniformity of the minimum luminance value.

Based on the embodiment shown in FIG. 6, the difference between the luminance uniformity (100%) of the maximum luminance value (825 nits) and the luminance uniformity (85%) of the minimum luminance value (700 nits) is approximately 15%.

The controller 100 may determine the maximum luminance value to be adjusted in order to change the luminance uniformity of the minimum luminance value. That is, when the maximum luminance value is changed, the luminance uniformity of the minimum luminance value is changed. When the maximum luminance value is lowered, the difference between the maximum luminance value and the minimum luminance value decreases, so that the luminance uniformity may be increased.

The controller 100 may determine, for example, a change amount of the maximum luminance value to be adjusted in order to change the luminance uniformity of the minimum luminance value by 1%. In other words, in order to increase the luminance uniformity of the minimum luminance value by 1%, it is possible to calculate the change amount for how much the maximum luminance value should be lowered.

Based on the embodiment illustrated in FIG. 6, the controller 100 divides the difference (125 nits) between the calculated maximum luminance value and the minimum luminance value into a difference (15%) between the luminance uniformity of the maximum luminance value and the luminance uniformity of the minimum luminance value. Based on this, it is possible to determine the change amount (approximately 8.3 nit/%) of the maximum luminance value to be adjusted in order to change the luminance uniformity of the minimum luminance value.

That is, according to the calculated value of 8.3 nit/%, it means that the maximum luminance value should be lowered by 8.3 nits in order to increase the luminance uniformity of the minimum luminance value by 1%. In the same vein, lowering the maximum luminance value by 8.3 nits means that the luminance uniformity of the minimum luminance value increases by 1%.

In one embodiment of the disclosed invention, the controller 100 determines the amount of change in the maximum luminance value to be adjusted in order to change the luminance uniformity of the minimum luminance value to "1%." The criteria for changing the luminance uniformity of the minimum luminance value can be 1% as well as in various embodiments.

The user can increase the luminance uniformity of the minimum luminance value by lowering the maximum luminance value, so that the luminance of the display apparatus 1 screen can be secured.

The compensation device of luminance uniformity 10 may provide the user with data on the luminance uniformity of the minimum luminance value that is changed in response to the change of the maximum luminance value calculated by the controller 100.

Figure 8:
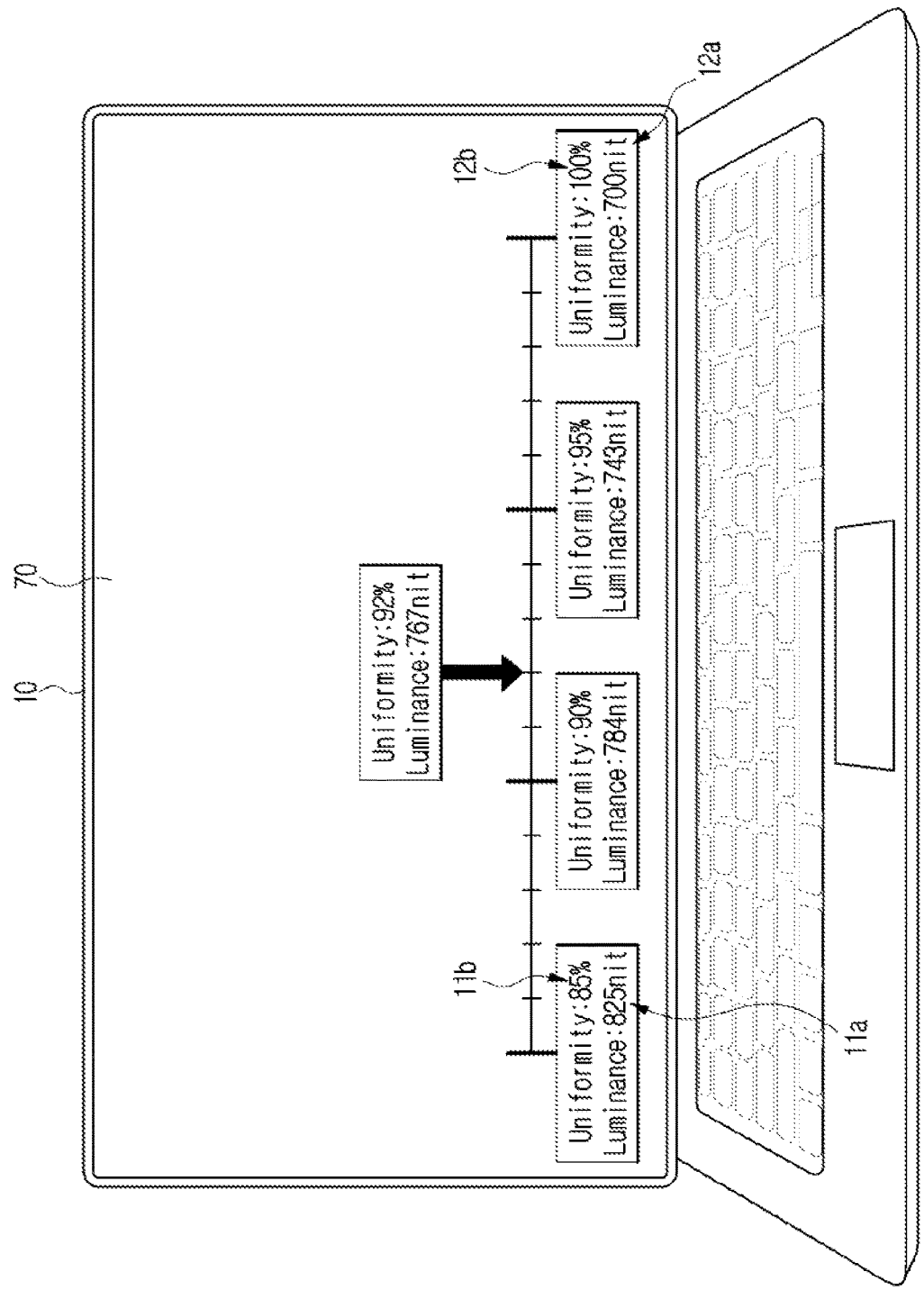
FIG. 8 illustrates a screen on which data on luminance uniformity of a minimum luminance value changed in response to a change in a maximum luminance value calculated according to an embodiment is displayed.
Figure 9:
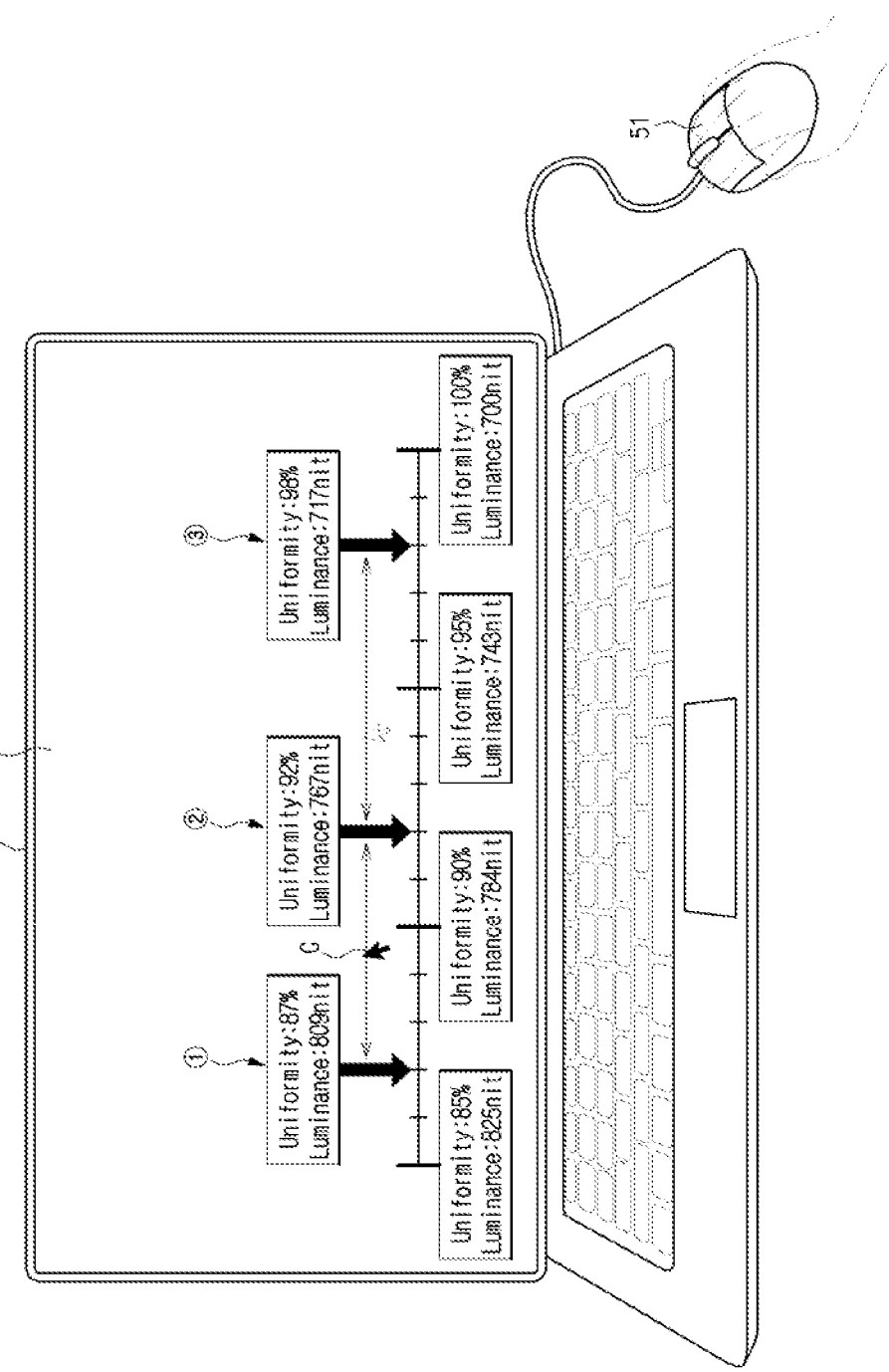
FIG. 9 illustrates that a change in a maximum luminance value adjusted to change luminance uniformity of a minimum luminance value is input based on a screen displayed on a compensation device of luminance uniformity according to an embodiment.
Figure 10:
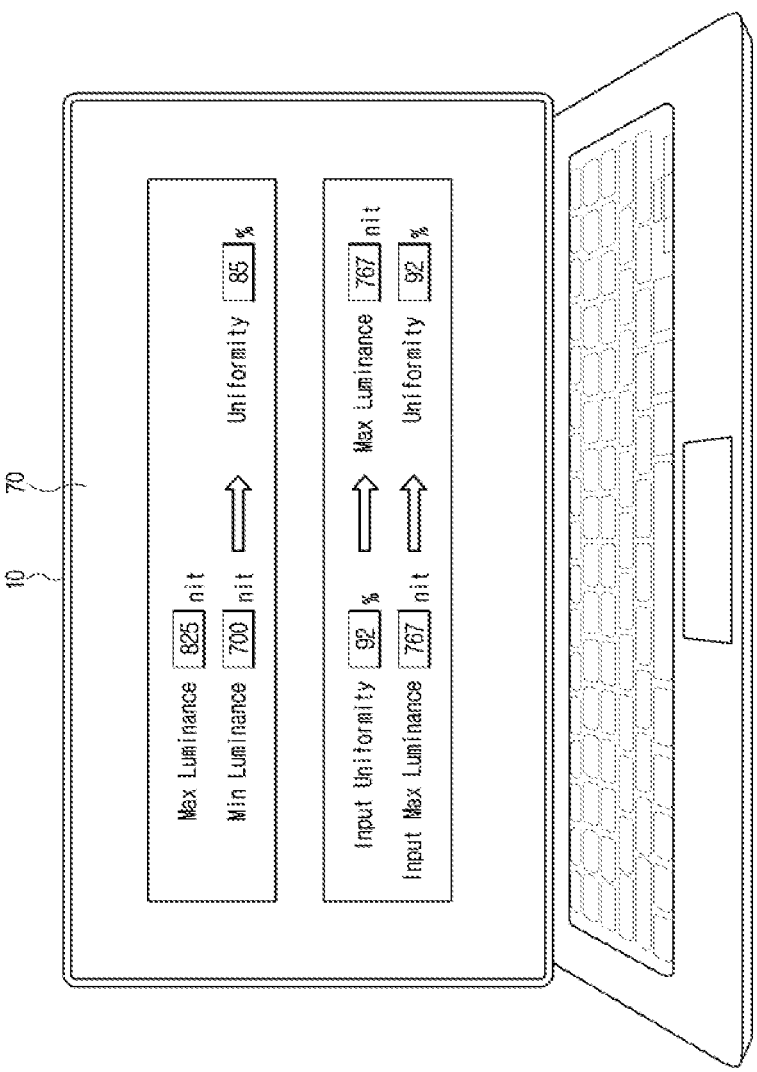
FIG. 10 illustrates a diagram that a change amount of a maximum luminance value that is adjusted to change luminance uniformity of a minimum luminance value is input based on a screen displayed on a compensation device of luminance uniformity according to another embodiment.

FIG. 8 illustrates a screen on which data on luminance uniformity of a minimum luminance value changed in response to a change in the maximum luminance value calculated according to an embodiment is displayed. FIG. 9 illustrates that a change in a maximum luminance value adjusted to change luminance uniformity of a minimum luminance value is input based on a screen displayed on a compensation device of luminance uniformity according to an embodiment. FIG. 10 illustrates a diagram that a change amount of a maximum luminance value that is adjusted to change luminance uniformity of a minimum luminance value is input based on a screen displayed on a compensation device of luminance uniformity according to another embodiment.

Referring to FIG. 8, the controller 100 may generate and transmit a control signal to display the luminance uniformity that is changed in response to the change in the maximum luminance value and the change in the maximum luminance value to be adjusted in order to change the luminance uniformity of the minimum luminance value to the display 70.

The display 70 may display data related to the control of the compensation device of luminance uniformity 10, and may be implemented as a display unit including a general display panel or a touch screen including a touch panel.

The display 70 may display the luminance uniformity that is changed in response to the change in the maximum luminance value and the change in the maximum luminance value to be adjusted to change the luminance uniformity of the minimum luminance value based on the control signal transmitted by the controller 100.

Based on the information displayed on the display 70, the user can select the luminance uniformity and the maximum luminance value of the display apparatus 1 to a desired level.

Referring to FIG. 8, on the display 70 of the compensation device of luminance uniformity 10, the luminance uniformity and the maximum luminance value may be displayed in the form of a slide bar.

In FIG. 8, data 11a indicated by 825 nits corresponds to the maximum luminance value of the display apparatus 1 acquired by the data acquirer 40 as described above, and data 11b indicated by 85% means the luminance uniformity of the minimum luminance value of 700 nits based on the maximum luminance value of 825 nits.

In addition, data 12a indicated as 700 nits means that the maximum luminance value of 825 nits is lowered to 700 nits, and data 12b displayed as 100% means the luminance uniformity of the minimum luminance value (700 nits) when the maximum luminance value is lowered to 700 nits. That is, when the maximum luminance value is lowered to 700 nits, the luminance uniformity at this time is 100% because it is the same as the minimum luminance value.

As described above, in order to increase the luminance uniformity of the minimum luminance value by 1%, the maximum luminance value must be lowered by 8.3 nits.

Therefore, in order to achieve the luminance uniformity of the minimum luminance value by 90%, the maximum luminance value must be lowered to 784 nits. Likewise, if the luminance uniformity of the minimum luminance value is 92%, the maximum luminance value must be lowered to 767 nits, and if the luminance uniformity of the minimum luminance value is 95%, the maximum luminance value must be lowered to 743 nits.

The user can select the level of the luminance uniformity and the maximum luminance value of the display apparatus 1 based on the data on the luminance uniformity and the maximum luminance value displayed on the display 70. That is, it is possible to select a value that reduces luminance loss of the maximum luminance value while securing the luminance uniformity of the screen of the display apparatus 1 based on the luminance uniformity calculated by the controller 100 and the amount of change in the maximum luminance value.

The user may input a change amount of the maximum luminance value adjusted to change the luminance uniformity of the minimum luminance value through the input 50. Also, the user may input a new setting value for the luminance uniformity of the minimum luminance value.

The input 50 may be implemented using a physical button, a knob, a touch pad, a touch screen, a stick-type manipulation device, or a trackball. The user can input various control commands related to the compensation device of luminance uniformity 10 through the input 50.

Referring to FIG. 9, the user can input the luminance uniformity of the minimum luminance value and the amount of change in the maximum luminance value by operating a mouse 51.

On the display 70 of the compensation device of luminance uniformity 10, the luminance uniformity and the maximum luminance value can be displayed in the form of a slide bar. Specifically, as shown in FIG. 8, a change amount of the maximum luminance value to be adjusted and a change in the luminance uniformity corresponding to the change amount of the maximum luminance value may be displayed at the bottom of the slide bar.

The user can see how much the luminance uniformity and the maximum luminance value need to be changed by looking at the information displayed at the bottom of the slide bar, and how much the value depends on the change.

The user can move a cursor C displayed on the display 70 left and right by operating the mouse 51. As the cursor C moves to the left and right of the slide bar, the user can select the luminance uniformity and the maximum luminance value corresponding to the scale on which the cursor C is located.

At the top of the slide bar, the luminance uniformity and the maximum luminance value that changes as the user moves the cursor C may be displayed.

As shown in FIG. 9, when the user moves the cursor C to position ①, information on the luminance uniformity (87%) of the minimum luminance value when the maximum luminance value is lowered to 809 nits is displayed on the top of the slide bar.

When the user moves the cursor C to position ②, information on the luminance uniformity (92%) of the minimum luminance value when the maximum luminance value is lowered to 767 nits may be displayed on the top of the slide bar.

When the user moves the cursor C to position ③, information on the luminance uniformity (98%) of the minimum luminance value when the maximum luminance value is lowered to 717 nits may be displayed on the top of the slide bar.

The user can select the data for the luminance uniformity of the minimum luminance value displayed on the display 70 and the maximum luminance value, and the controller 100 may generate a control signal for changing the luminance uniformity of the minimum luminance value of the display apparatus 1 based on the data selected by the user.

That is, if the user selects the luminance uniformity of the minimum luminance value as 92% and the maximum luminance value as 767 nits, the controller 100 may generate a control signal that lowers the maximum luminance value of the display apparatus 1 from 825 nits to 767 nits so that the luminance uniformity is 92%.

Referring to FIG. 10, the user can directly input the luminance uniformity of the minimum luminance value and the set values for the maximum luminance value.

In the display 70 illustrated in FIG. 10, the maximum luminance value (825 nits), the minimum luminance value (700 nits), and the luminance uniformity (85%) of the minimum luminance value of the current screen of the display apparatus 1 may be displayed.

The user may input a command for directly setting the luminance uniformity and the maximum luminance value of the image displayed on the display apparatus 1 through the input 50.

When the user wants to set the luminance uniformity of the minimum luminance value of the display apparatus 1 screen to 92%, the user can directly input the luminance uniformity value to 92%, and a corresponding maximum luminance value (767 nits) may be displayed on the display 70.

If the user enters the setting value for the luminance uniformity of the minimum luminance value as 92%, and the maximum luminance value as 767 nits, the controller 100 may generate a control signal that lowers the maximum luminance value of the display apparatus 1 from 825 nits to 767 nits so that the luminance uniformity is 92%.

The controller 100 may control the communicator 80 to transmit a control signal for changing the luminance uniformity and maximum luminance value of the display apparatus 1 to the display apparatus 1, and the display apparatus 1 may change the luminance uniformity by lowering the maximum luminance value of the screen based on the control signal generated by the controller 100.

The communicator 80 is a component for performing communication with the display apparatus 1. The communicator 80 can be connected to the display apparatus 1 through a wire, such as, a USB interface or other serial interface, or can be connected through various wireless communication interfaces such as Wi-Fi, Bluetooth, NFC (Near Field Communication), Zigbee, 3G, 4G, and the like. Accordingly, the communicator 80 can transmit data calculated by the controller 100 to the display apparatus 1.

The storage 90 can store programs and various data necessary for the operation of the compensation device of luminance uniformity 10. That is, data on the luminance value of the screen of the display apparatus 1 acquired by the data acquirer 40 can be stored, and data on the maximum luminance value, the minimum luminance value, and the luminance uniformity determined by the controller 100 may also be stored.

In addition, the storage 90 may also store data on changes in the luminance uniformity and the maximum luminance value calculated by the controller 100. On the other hand, according to another embodiment of the disclosed invention, the data that can be stored in the storage 90 may be stored in the display apparatus 1 itself, or it may be provided by a device other than the compensation device of luminance uniformity 10 (for example, a server device). In this embodiment, the storage 90 may be omitted.

The storage 90 may be implemented by a nonvolatile memory device such as cache, read only memory (ROM), programmable ROM (PROM), erasable programmable ROM (EPROM), electrically erasable programmable ROM (EPMROM), and flash memory or a volatile memory such as random access memory (RAM). It may be implemented as at least one of a volatile memory device such as random access memory (RAM), a hard disk drive (HDD), or a storage medium such as CD-ROM, but is not limited thereto. The storage 90 may be a memory implemented in a separate chip from the above-described processor in relation to the controller 100, or may be implemented in a single chip from the processor.

Figure 11:
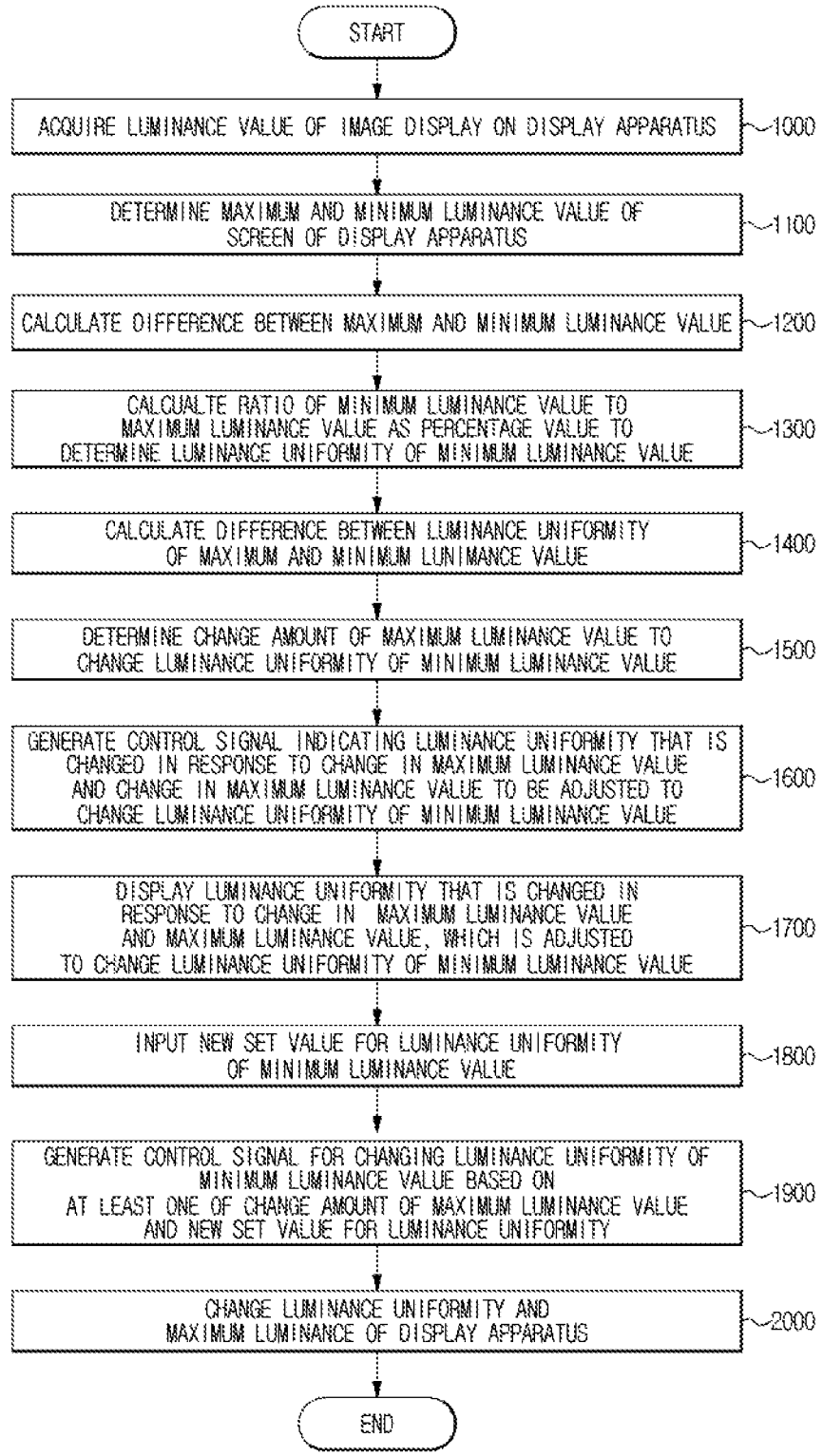
FIG. 11 is a flowchart illustrating a method for controlling a compensation device of luminance uniformity according to an embodiment.

FIG. 11 is a flowchart illustrating a method for controlling a compensation device of luminance uniformity according to an embodiment.

Referring to FIG. 11, the data acquirer 40 can acquire the luminance value of the image displayed on the display apparatus 1 from the luminance uniformity measurement unit 20 (1000). The controller 100 may determine the maximum luminance value and the minimum luminance value based on the luminance value acquired by the data acquirer 40 (1100).

The controller 100 can calculate the difference between the maximum luminance value and the minimum luminance value (1200), and as described through Equation 1, the ratio of the minimum luminance value to the maximum luminance value may be calculated as a percentage value to determine the luminance uniformity of the minimum luminance value (1300).

The luminance uniformity is the ratio of other luminance values, based on the maximum luminance value. The controller 100 may calculate a difference between the luminance uniformity of the maximum luminance value and the luminance uniformity of the minimum luminance value (1400).

The controller 100 divides the difference between the maximum luminance value and the minimum luminance value calculated previously into the difference between the luminance uniformity of the maximum luminance value and the luminance uniformity of the minimum luminance value, in order to change the luminance uniformity of the minimum luminance value, a change amount of the maximum luminance value to be adjusted may be determined (1500).

In addition, the controller 100 may generate a control signal indicating the luminance uniformity that is changed in response to the change in the maximum luminance value and the change in the maximum luminance value to be adjusted to change the luminance uniformity of the minimum luminance value (1600), and the generated control signal can be transmitted to the display apparatus 1 through the communicator 80.

The display 70 may display the luminance uniformity that is changed in response to the change in the maximum luminance value and the maximum luminance value, which is adjusted to change the luminance uniformity of the minimum luminance value, based on the control signal transmitted by the controller 100 (1700).

The compensation device of luminance uniformity 10 may receive a new set value for the luminance uniformity of the minimum luminance value and the amount of change in the maximum luminance value adjusted to change the luminance uniformity of the minimum luminance value from the user (1800).

The controller 100 may generate a control signal for changing the luminance uniformity of the minimum luminance value based on at least one of a change amount of the maximum luminance value received from the user and a new set value for the luminance uniformity (1900).

The display apparatus 1 may change the luminance uniformity by lowering the maximum luminance value of the screen based on the control signal generated by the controller 100 (2000).

Meanwhile, the disclosed embodiments may be implemented in the form of a recording medium that stores instructions executable by a computer. Instructions may be stored in the form of program code, and when executed by a processor, may generate program modules to perform operations of the disclosed embodiments. The recording medium may be embodied as a computer-readable recording medium.

The computer-readable recording medium includes all kinds of recording media storing instructions that can be read by a computer. For example, there may be read only memory (ROM), random access memory (RAM), a magnetic tape, a magnetic disk, flash memory, and an optical data storage device.

As described above, the disclosed embodiments have been described with reference to the accompanying drawings. Those skilled in the art to which the present invention pertains will understand that the present invention may be practiced in different forms from the disclosed embodiments without changing the technical spirit or essential features of the present invention. The disclosed embodiments are illustrative and should not be construed as limiting.

The invention claimed is:

1. A compensation device for luminance uniformity, the compensation device comprising:
    a data acquirer configured to acquire a luminance value of an image displayed on a display apparatus;
    a controller configured to determine a maximum luminance value and a minimum luminance value among acquired luminance values, and determine luminance uniformity of the minimum luminance value based on the maximum luminance value, and determine a change amount of the maximum luminance value to be adjusted in order to change the determined luminance uniformity;
    a display configured to display the change amount of the maximum luminance value adjusted to change the luminance uniformity, and the luminance uniformity that is changed in response to the change amount of the maximum luminance value; and
    an input interface configured to:
    receive an input of the change amount of the maximum luminance value that is adjusted to change the luminance uniformity of the minimum luminance value, and
    receive a new set value for the luminance uniformity of the minimum luminance value.

2. The compensation device of claim 1, wherein the controller is further configured to calculate a difference between the determined maximum luminance value and the determined minimum luminance value.

3. The compensation device of claim 2, wherein the controller is further configured to determine the luminance uniformity of the minimum luminance value by calculating a ratio of the minimum luminance value to the maximum luminance value as a percentage value.

4. The compensation device of claim 3, wherein the controller is further configured to calculate a difference between the luminance uniformity of the determined maximum luminance value and the luminance uniformity of the determined minimum luminance value.

5. The compensation device of claim 4, wherein the controller is further configured to determine the change amount of the maximum luminance value to be adjusted in order to change the luminance uniformity of the minimum luminance value by dividing the difference between the determined maximum luminance value and the determined minimum luminance value by the difference between the luminance uniformity of the determined maximum luminance value and the luminance uniformity of the determined minimum luminance value.

6. The compensation device of claim 1, wherein the controller is further configured to generate a control signal for changing the luminance uniformity of the minimum luminance value of the display apparatus based on at least one of the change amount of the maximum luminance value and the new set value for the luminance uniformity.

7. The compensation device of claim 6 further comprising:
a communicator configured to transmit the generated control signal for changing the luminance uniformity to the display apparatus.

8. The compensation device of claim 1, wherein the data acquirer is further configured to divide a screen of the display apparatus into a plurality of sub-blocks, and acquire a luminance value of each of the sub-blocks.

9. A method of controlling a compensation device of luminance uniformity, the method comprising:
acquiring a luminance value of an image displayed on a display apparatus;
determining a maximum luminance value and a minimum luminance value among the acquired luminance values;
determining luminance uniformity of the minimum luminance value based on the maximum luminance value;
determining a change amount of the maximum luminance value to be adjusted in order to change the determined luminance uniformity;
displaying the change amount of the maximum luminance value adjusted to change the luminance uniformity, and the luminance uniformity that is changed in response to the change amount of the maximum luminance value;
receiving an input of the change amount of the maximum luminance value that is adjusted to change the luminance uniformity of the minimum luminance value; and
receiving a new set value for the luminance uniformity of the minimum luminance value.

10. The method of claim 9, wherein the determining the change amount of the maximum luminance value comprises calculating a difference between the determined maximum luminance value and the determined minimum luminance value.

11. The method of claim 10, wherein the determining the luminance uniformity of the maximum luminance value comprises determining the luminance uniformity of the minimum luminance value by calculating a ratio of the minimum luminance value to the maximum luminance value as a percentage value.

12. The method of claim 11, wherein the determining the change amount of the maximum luminance value comprises calculating a difference between the luminance uniformity of the determined maximum luminance value and the luminance uniformity of the determined minimum luminance value.

13. The method of claim 12, wherein the determining the change amount of the maximum luminance value comprises determining the change amount of the maximum luminance value to be adjusted in order to change the luminance uniformity of the minimum luminance value by dividing the difference between the determined maximum luminance value and the determined minimum luminance value by the difference between the luminance uniformity of the determined maximum luminance value and the luminance uniformity of the determined minimum luminance value.

* * * * *